US010167118B1

(12) United States Patent
Piscopo (10) Patent No.: US 10,167,118 B1
(45) Date of Patent: Jan. 1, 2019

(54) CLOSURE CAP WITH A FLANGE UPPER SURFACE HAVING AN INTERRUPTED ANNULAR RECESS

(71) Applicant: Plastek Industries, Inc., Erie, PA (US)

(72) Inventor: Peter A. Piscopo, Medford, NJ (US)

(73) Assignee: Plastek Industries, Inc., Erie, PA (US)

( * ) Notice: Subject to any disclaimer, the term of this patent is extended or adjusted under 35 U.S.C. 154(b) by 0 days.

(21) Appl. No.: 15/499,942

(22) Filed: Apr. 28, 2017

Related U.S. Application Data (60) Provisional application No. 62/329,121, filed on Apr. 28, 2016.

(51) Int. Cl.
| | |
|---|---|
| *B65D 47/12* | (2006.01) |
| *B65D 41/26* | (2006.01) |
| *B65D 25/42* | (2006.01) |
| *B65D 23/10* | (2006.01) |
| *B65D 1/02* | (2006.01) |
| *B65D 41/04* | (2006.01) |
| *B29C 49/42* | (2006.01) |
| *B29L 31/00* | (2006.01) |
| *B29L 1/00* | (2006.01) |
| *B29K 23/00* | (2006.01) |

(52) U.S. Cl.
CPC ........ *B65D 47/122* (2013.01); *B29C 49/4273* (2013.01); *B65D 1/0207* (2013.01); *B65D 1/0246* (2013.01); *B65D 23/10* (2013.01); *B65D 25/42* (2013.01); *B65D 41/04* (2013.01); *B65D 41/26* (2013.01); *B29K 2023/065* (2013.01); *B29L 2001/007* (2013.01); *B29L 2031/712* (2013.01)

(58) Field of Classification Search
CPC .... B65D 1/0246; B65D 41/02; B65D 41/023; B65D 41/0407; B65D 41/0428; B65D 41/04; B65D 41/26; B65D 47/122; B65D 1/0207; B65D 23/10; B65D 25/42
USPC ................................ 222/109, 562, 566–574
See application file for complete search history.

(56) References Cited

U.S. PATENT DOCUMENTS

| | | | | |
|---|---|---|---|---|
| 4,640,855 A | * | 2/1987 | St. Clair ................ | B65D 23/06 215/356 |
| 4,671,421 A | * | 6/1987 | Reiber ..................... | B65D 1/46 215/228 |
| 4,830,234 A | | 5/1989 | Odet | |

(Continued)

FOREIGN PATENT DOCUMENTS

WO     2014/071154 A1    5/2014

OTHER PUBLICATIONS

U.S. Office Action dated Feb. 7, 2017 for U.S. Appl. No. 14/790,435.

*Primary Examiner* — Patrick M Buechner
(74) *Attorney, Agent, or Firm* — Bachman & LaPointe, P.C.

(57) ABSTRACT

A container has a body, a spout fitment, and a cap. The body has a neck extending to a mouth defining a body opening. The spout fitment has: a spout within the body opening; and an outer wall within the neck. The cap has: an upper sidewall; a flange protruding radially from upper the sidewall; and an outer sidewall depending from the flange. An internal thread of the cap outer sidewall is engaged to an external thread of the neck wall. An underside of the flange contacts the mouth. An upper surface of the flange has an interrupted annular recess.

19 Claims, 8 Drawing Sheets

(56) References Cited

U.S. PATENT DOCUMENTS

| | | | | |
|---|---|---|---|---|
| 4,917,268 A | * | 4/1990 | Campbell | B65D 47/06 222/109 |
| 4,949,884 A | * | 8/1990 | Dahl | B44D 3/127 220/792 |
| 4,993,605 A | * | 2/1991 | Del'Re | B65D 41/26 222/109 |
| 5,071,037 A | * | 12/1991 | Moore | B65D 23/06 222/109 |
| 5,188,249 A | * | 2/1993 | Cargile | B65D 1/023 215/341 |
| 5,234,130 A | | 8/1993 | Benioff et al. | |
| 5,431,306 A | * | 7/1995 | Reid | B65D 47/06 222/109 |
| 5,462,202 A | * | 10/1995 | Haffner | B65D 41/26 222/109 |
| 5,566,862 A | | 10/1996 | Haffner et al. | |
| 5,597,090 A | * | 1/1997 | Leahy | B65D 47/06 222/1 |
| 5,603,787 A | | 2/1997 | Reid | |
| 5,624,053 A | * | 4/1997 | Freek | B65D 21/0219 220/380 |
| 5,794,803 A | | 8/1998 | Sprick | |
| 5,855,299 A | | 1/1999 | Arnold et al. | |
| 5,941,422 A | | 8/1999 | Struble | |
| 6,032,829 A | * | 3/2000 | Geisinger | B65D 39/08 215/209 |
| 6,223,945 B1 | * | 5/2001 | Giblin | B65D 1/0207 215/12.1 |
| 6,659,310 B1 | | 12/2003 | Wolpert | |
| 6,923,341 B2 | | 8/2005 | Smith | |
| 6,964,359 B1 | * | 11/2005 | Darr | B65D 47/06 222/570 |
| 7,097,076 B1 | | 8/2006 | Giblin et al. | |
| 2004/0011812 A1 | * | 1/2004 | Kasting et al. | |
| 2005/0103803 A1 | | 5/2005 | Hung et al. | |
| 2005/0139609 A1 | * | 6/2005 | Giblin | B65D 23/102 222/109 |
| 2006/0000792 A1 | * | 1/2006 | Hennebelle | B65D 41/0414 215/228 |
| 2006/0102662 A1 | * | 5/2006 | Rohr | B65D 25/42 222/570 |
| 2008/0164282 A1 | * | 7/2008 | Szekely | B65D 47/123 222/111 |
| 2009/0045224 A1 | * | 2/2009 | Faaborg | B65D 41/0471 222/111 |
| 2009/0101682 A1 | | 4/2009 | Szekely et al. | |
| 2010/0043910 A1 | | 2/2010 | Szekely et al. | |
| 2010/0116776 A1 | * | 5/2010 | Szekely | B65D 47/125 215/329 |
| 2011/0204099 A1 | * | 8/2011 | Piscopo | B65D 1/023 222/111 |
| 2017/0073115 A1 | * | 3/2017 | Crawford | B65D 47/06 |
| 2017/0073128 A1 | * | 3/2017 | Crawford | B65D 47/06 |

\* cited by examiner

CLOSURE CAP WITH A FLANGE UPPER SURFACE HAVING AN INTERRUPTED ANNULAR RECESS

CROSS-REFERENCE TO RELATED APPLICATION

Benefit is claimed of U.S. Patent Application No. 62/329,121, filed Apr. 28, 2016, and entitled "Spout Fitment", the disclosure of which is incorporated by reference herein in its entirety as if set forth at length.

BACKGROUND OF THE INVENTION

The invention relates to containers. More particularly, the invention relates to pour spouts for containers for liquid laundry detergent and the like.

There has been an evolution in the configuration of containers for liquid laundry detergent, fabric softener, and the like. The dominant form of container is a wide mouth bottle having an attached spout with a drain-back trough and aperture (often identified as a drain back spout (DBS) configuration). In a typical group of container configurations and their methods of assembly, a bottle body, spout fitment, and cap are individually molded (e.g., of high density polyethylene (HDPE) for the body, polypropylene for the cap, and low density polypropylene (LDPE) for the spout fitment). Exemplary bottle body molding is via blow molding whereas exemplary spout fitment and cap molding are by injection molding. An exemplary spout fitment includes the spout and a continuation of the spout defining the base and outboard wall of the trough. The fitment further typically includes a flange (e.g., extending outward at an upper end of the outboard extremity of the outboard wall).

The spout fitment may be inserted through a mouth of the bottle body (e.g., so that an outer surface of the outboard trough wall, or another wall outboard thereof, engages the inner surface of the bottle neck). The spout fitment may be secured and sealed to the bottle body such as by spin welding. The bottle may be filled and the cap may be installed. Exemplary caps typically have either an externally threaded skirt for engaging an internally threaded portion of the fitment or an internally threaded skirt for engaging an externally threaded portion of the fitment or bottle body neck. With a typical externally threaded skirt, the cap includes an outwardly projecting flange above the skirt. Upon installation of the cap to the fitment, the flange underside contacts and seals with the fitment flange upper surface to seal the bottle.

Various examples of bottles are shown in U.S. Pat. Nos. 6,923,341, 5,941,422, 5,566,862, and 5,603,787. US Patent Publications 2010/0043910 and 2009/0101682 disclose particular examples of snap-in and snap-over spout fitments. U.S. patent application Ser. No. 14/790,435, filed Jul. 2, 2015, and entitled "Snap-In Spout Fitment and Manufacture Methods", the disclosure of which is incorporated by reference herein in its entirety as if set forth at length, shows an exemplary baseline spout fitment building on the prior bottles and forming the basis for further improvements below.

International Application No. WO/2014/071154, published May 8, 2014 discloses additional bottle filling methods.

SUMMARY OF THE INVENTION

One aspect of the invention involves a container comprising a body having a neck extending to a mouth defining a body opening. A spout fitment has: a spout within the body opening; and an outer wall within the neck. A cap has: sidewall; a flange protruding from the sidewall, an underside of the flange contacting the mouth; and an outer wall depending from the flange, an internal thread of the cap outer wall engaged to an external thread of the neck wall. The flange has an upper surface having an interrupted annular recess.

A further embodiment may additionally and/or alternatively include the interrupted annular recess comprising 20-50 segments separated by walls.

A further embodiment may additionally and/or alternatively include the walls being less than half the angular extent of the recess segments.

A further embodiment may additionally and/or alternatively include the walls being less than one-third the angular extent of the recess segments.

A further embodiment may additionally and/or alternatively include the walls having upper surfaces dropping subflush to a portion of the upper surface radially outward of the recess.

A further embodiment may additionally and/or alternatively include the flange underside having an outwardly upwardly tapering surface below the recess.

A further embodiment may additionally and/or alternatively include the interrupted annular recess having a depth of 0.017 inch to 0.055 inch (0.4 mm to 1.4 mm).

A further embodiment may additionally and/or alternatively include the spout fitment being subflush in the neck.

A further embodiment may additionally and/or alternatively include the fitment comprising a trough between the outer wall and spout with at least one drain aperture.

A further embodiment may additionally and/or alternatively include the body consisting essentially of HDPE; the spout fitment consisting essentially of low density polypropylene; and the cap consisting essentially of copolymer polypropylene.

A further embodiment may additionally and/or alternatively include the body having an integrally molded handle; and an interior compartment of the body extends through the handle.

A further embodiment may additionally and/or alternatively include the fitment being neither adhered nor welded to the body.

A further embodiment may additionally and/or alternatively include the fitment being not threadingly engaged to the body.

A further embodiment may additionally and/or alternatively include 1.0-6.0 liters of a liquid within the body.

A further embodiment may additionally and/or alternatively include at least 1.0 liter of liquid detergent or fabric softener within the body A further embodiment may additionally and/or alternatively include the body being a blow molded body.

A further embodiment may additionally and/or alternatively include a method for manufacturing the container comprising: molding the body; machining the molded body to form a surface portion of the neck; and threading the cap onto the body to a threaded condition where the surface portion extends to a contact location with the underside.

A further embodiment may additionally and/or alternatively include, prior to the threading, inserting the spout fitment into the body.

A further embodiment may additionally and/or alternatively include the inserting comprising inserting subflush to a rim.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
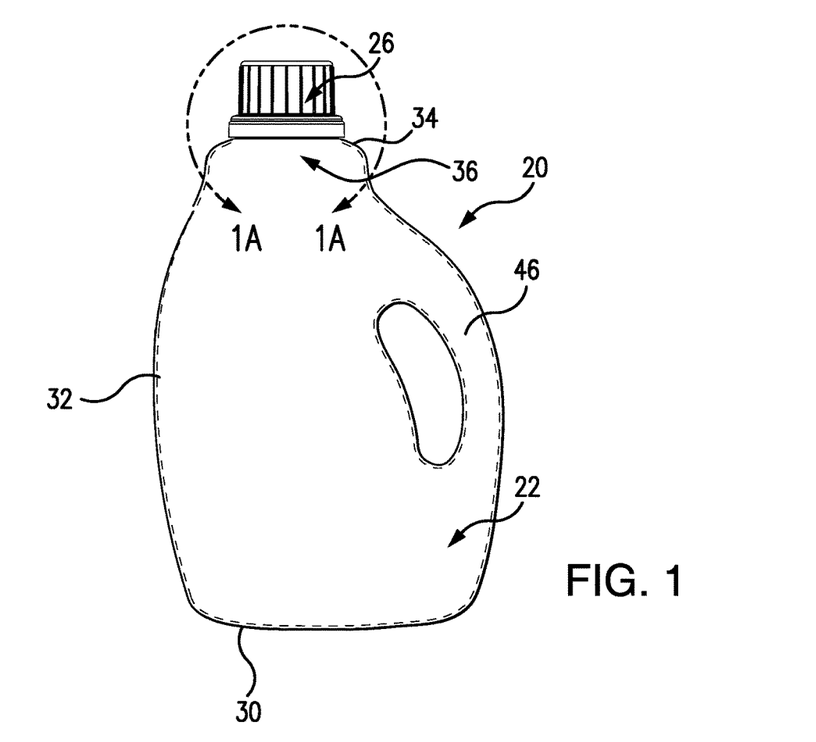
FIG. 1 is a side view of a bottle.
Figure 1A:
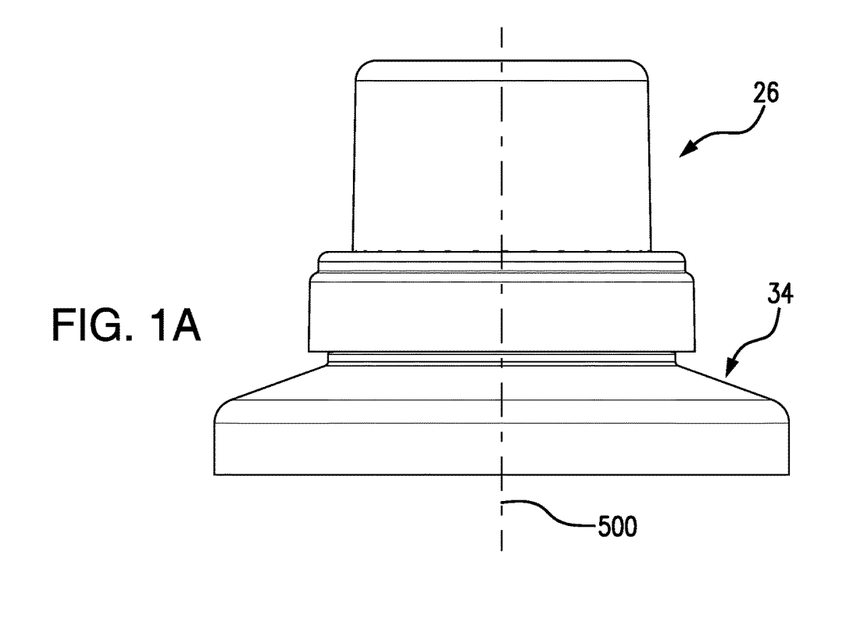
FIG. 1A is an enlarged view of an upper portion of the bottle of FIG. 1.
Figure 6:
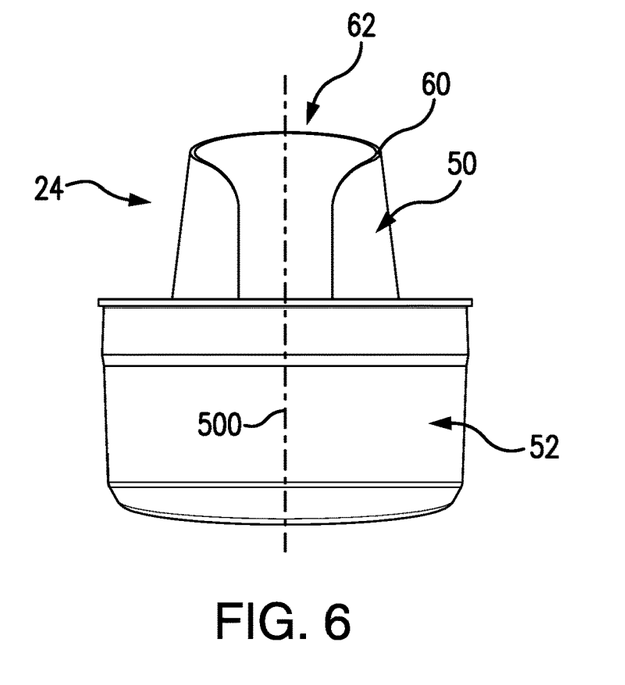
FIG. 6 is rear view of a spout fitment of the bottle of FIG. 1.
Figure 7:
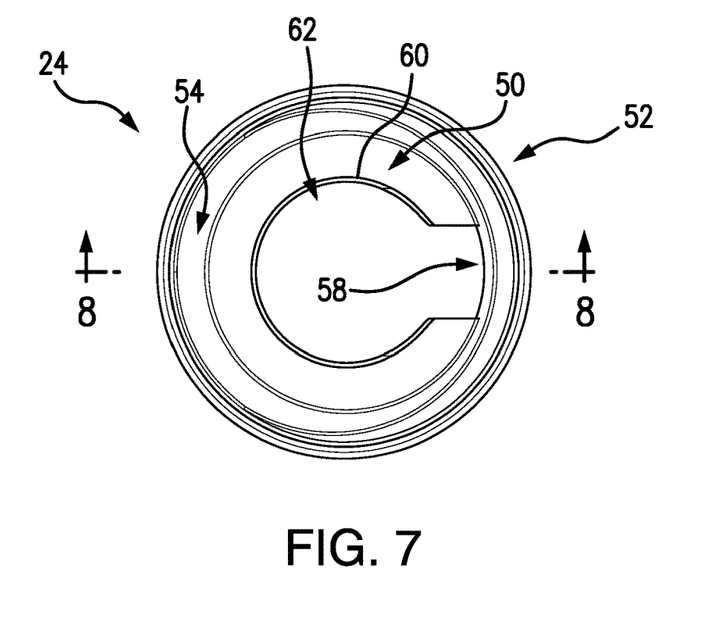
FIG. 7 is a top view of the spout fitment.
Figure 8:
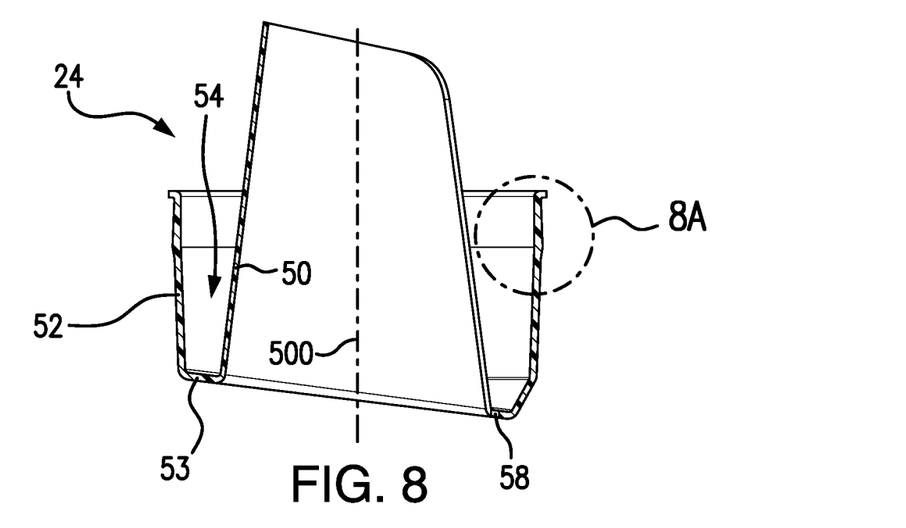
FIG. 8 is a central vertical medial sectional view of the spout fitment.
Figure 8A:
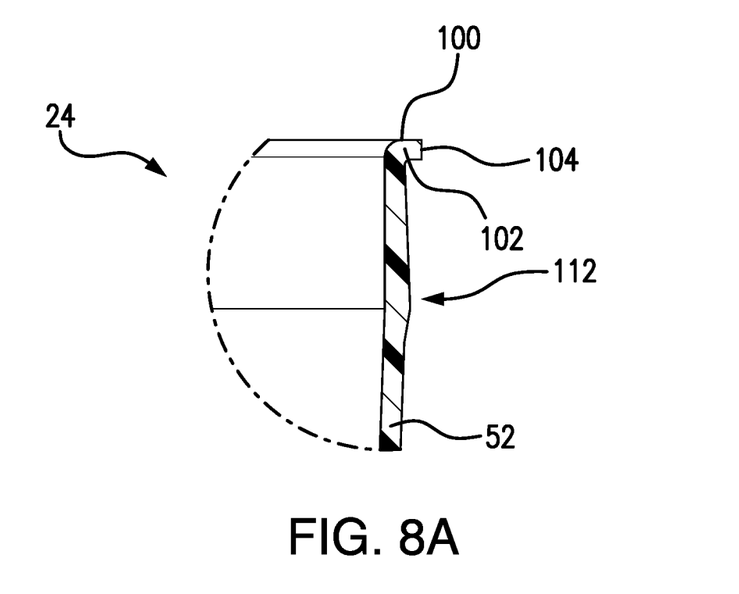
FIG. 8A is an enlarged view of a rim portion of the spout fitment of FIG. 8.

FIG. 1 shows a container 20 comprising the assembly of a bottle body 22, a spout fitment 24 (FIG. 6), and a cap 26 (which may serve as a measuring/dispensing cup). Each may be made as a unitary plastic molding. Exemplary bottle body material is high density polyethylene (HDPE). Exemplary spout fitment and cap material is polypropylene (e.g., LDPE for the spout fitment and copolymer polypropylene for the cap).

Figure 9:
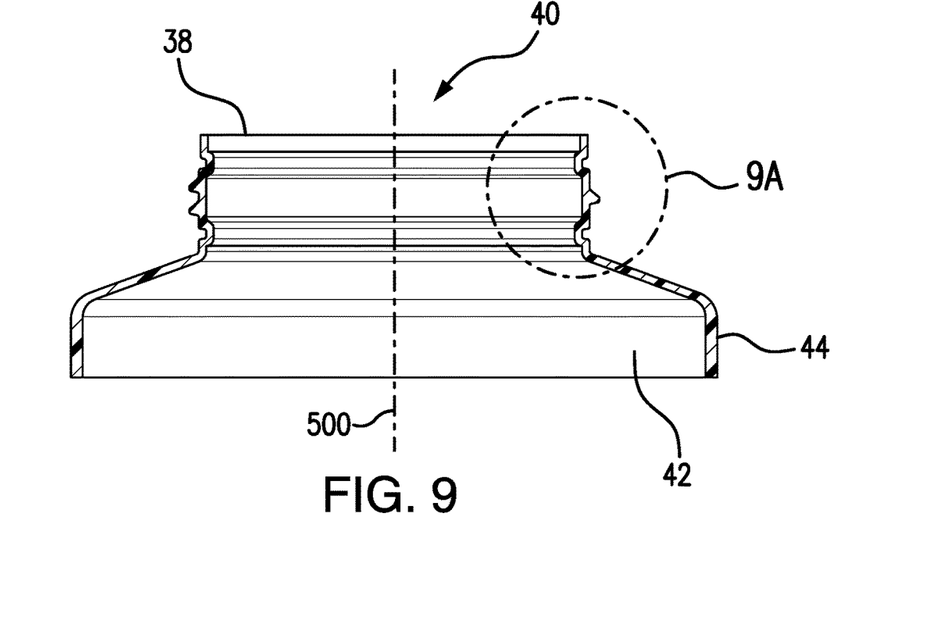
FIG. 9 is a central vertical medial sectional view of a neck region of a body of the bottle.
Figure 9A:
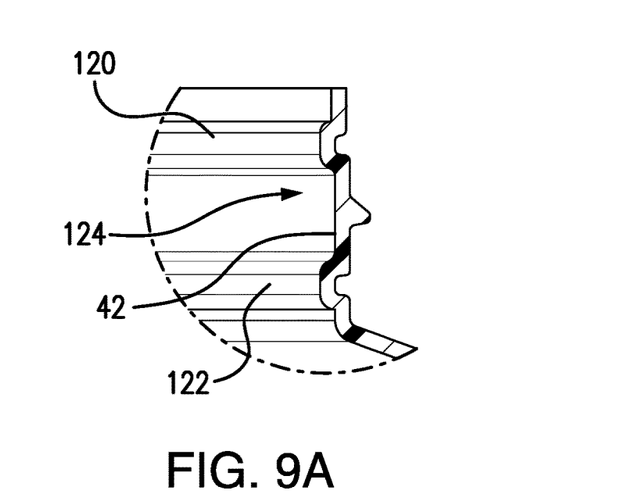
FIG. 9A is an enlarged view of a portion of the neck of FIG. 9.

The body 22 comprises a unitary combination of a base 30, a sidewall 32 extending upward from the base, a shoulder 34 at an upper end of the sidewall, and a neck 36 extending upward from the shoulder to a rim 38 (FIG. 4A) and defining an opening 40 (FIG. 9) having a central longitudinal axis 500. In this example, an axis 500 (FIG. 3) serves as a central longitudinal axis of the spout fitment, cap, and neck of the bottle. In this exemplary embodiment, the axis 500 is vertical when the bottle is resting atop a horizontal surface. Other orientations may be possible. With this exemplary frame of reference, with the bottle in the upright condition, a direction 502 (FIG. 4) is upward parallel to the axis 500 and in opposite direction 504 is downward. Unless otherwise indicated, this frame of reference is used to explain relative position. Clearly, the bottle will be at least partially inverted to pour.

The bottle body has an interior surface 42 and an exterior surface 44. A handle 46 (FIG. 1) may extend from the sidewall and the body interior may extend through the handle The spout fitment 24 includes an inner wall 50 (FIG. 4) and an outer sidewall 52. The outer sidewall and inner wall are joined by a lower wall 53 so as to define a trough 54.

One or more drain-back apertures 58 (FIG. 4) are open to the trough (e.g., through the wall 53). The inner wall 50 forms a spout and has an upper end 60 defining a spout opening 62. The upper end 60 peaks along a forward portion and dips along a rearward portion so that the opening 62 is asymmetric and defines a preferential direction for pouring. The exemplary drainback aperture 58 is formed as a rear end portion of the opening 62.

The cap 26 includes an upper sidewall 70, a transverse web 72 at the upper end of the upper sidewall, and an outwardly projecting flange 74. An inner/lower sidewall 90 depends from a junction of the flange and upper sidewall to a lower rim 92. The inner sidewall 90 forms a dosing tube which combines with the space within the upper sidewall 70 (and web 72) thereabove to define a dose volume containable by the cap. When acting as a cup, the cap web 72 forms a base of the cup and the combined upper sidewall 70 and the dosing tube 90 form a sidewall of the cup. The inner surface of the dosing tube and/or the inner surface of the upper sidewall may bear level indicia such as a scale.

Figure 4:
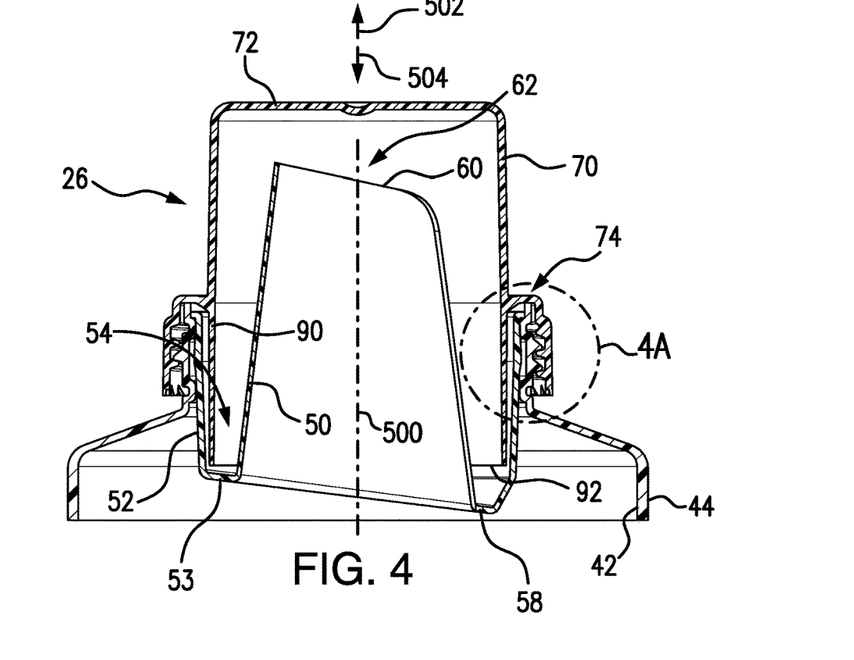
FIG. 4 is a central vertical sectional view of the portion of FIG. 3, taken along line 4-4.

An outer sidewall or skirt 76 depends from a periphery of the flange 74 and has a lower rim 78. An inner diameter (ID) surface 80 (FIG. 4A) of the sidewall 76 bears an internal thread 82. The lower rim 78 may have recesses/compartments 83 (FIG. 4A) called "unscrewing dogs" which allow for rotational retention when a thread molding core is unscrewed from a freshly molded cap. FIG. 4 shows the body neck as bearing an external thread 84 mounted to the internal thread 82.

Figure 4A:
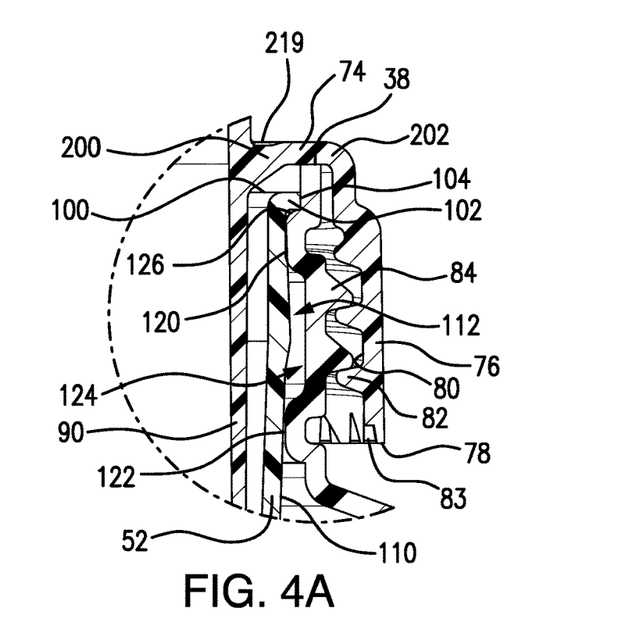
FIG. 4A is an enlarged view of a portion of a rim area.

FIG. 4A shows a condition wherein the spout fitment is installed to the bottle body and the cap screwed down into sealing engagement with the bottle body. Exemplary installation of the spout fitment is via a snap-in engagement. FIG. 4A shows interfitting of engagement features of the spout fitment and bottle body. As noted above, these are shown interfering due to artifacts of computer modeling of the components in relaxed as-molded conditions rather than deformed assembled conditions. FIG. 4A shows the spout fitment outer sidewall 52 extending to an upper rim 100 and having a radially projecting flange 102 at the rim 100 having a radial rim 104. Below the flange 102, the outer diameter (OD) 110 surface of the outer sidewall 52 has a radial protrusion 112. The exemplary radial protrusion is formed by a local thickening of the sidewall 52.

The flange 102 and protrusion 112 may form features for mounting the spout fitment to the bottle body. To cooperate with these spout fitment features, the bottle body neck along its inner diameter (ID) or interior surface 42 has exemplary upper and lower radially-inward annular protrusions 120 and 122 (FIG. 4A) defining a channel 124 therebetween. In the assembled/installed condition, the underside of the flange 102 (FIG. 4A) abuts an upper surface portion 126 of the protrusion 120 to resist further insertion of the spout fitment. This exemplary installed/inserted condition involves the rim 100 (FIG. 10A) of the spout fitment being subflush to the rim 38 of the bottle body. The channel 124 receives the protrusion 112. One or both of the protrusions 120, 122 may be in sealing contact with the OD surface 110. With the spout fitment in a fully seated position, the protrusion 112 is approximately centered between the protrusions 120, 122 and a tapering of the surface 100 away from the protrusions helps keep the protrusions aligned/seated in this position to prevent extraction. This seating plus the interaction of the spout fitment flange with the upper surface of the protrusion 120 helps resist further insertion below the seated position. FIG. 4A shows an as-molded radial interference between the flange and neck as an exemplary 0.050 inch (1.3 mm).

Figure 2:
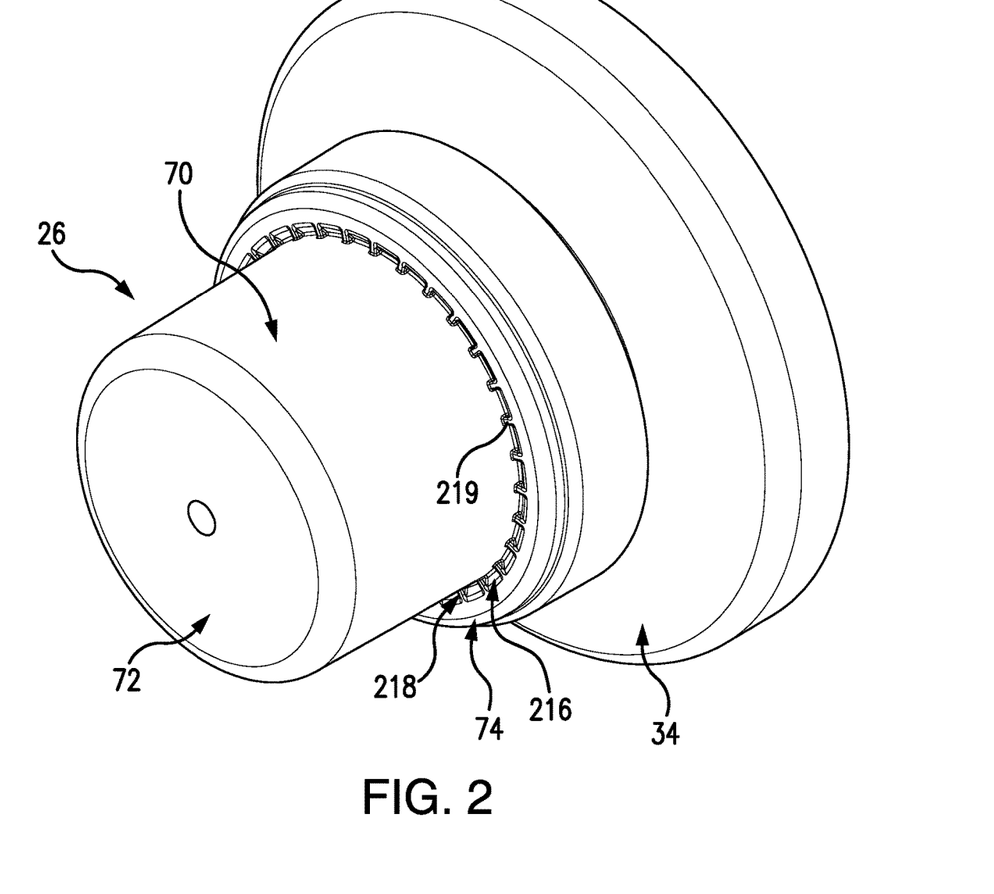
FIG. 2 is a view of an upper portion of the bottle of FIG. 1.
Figure 3:
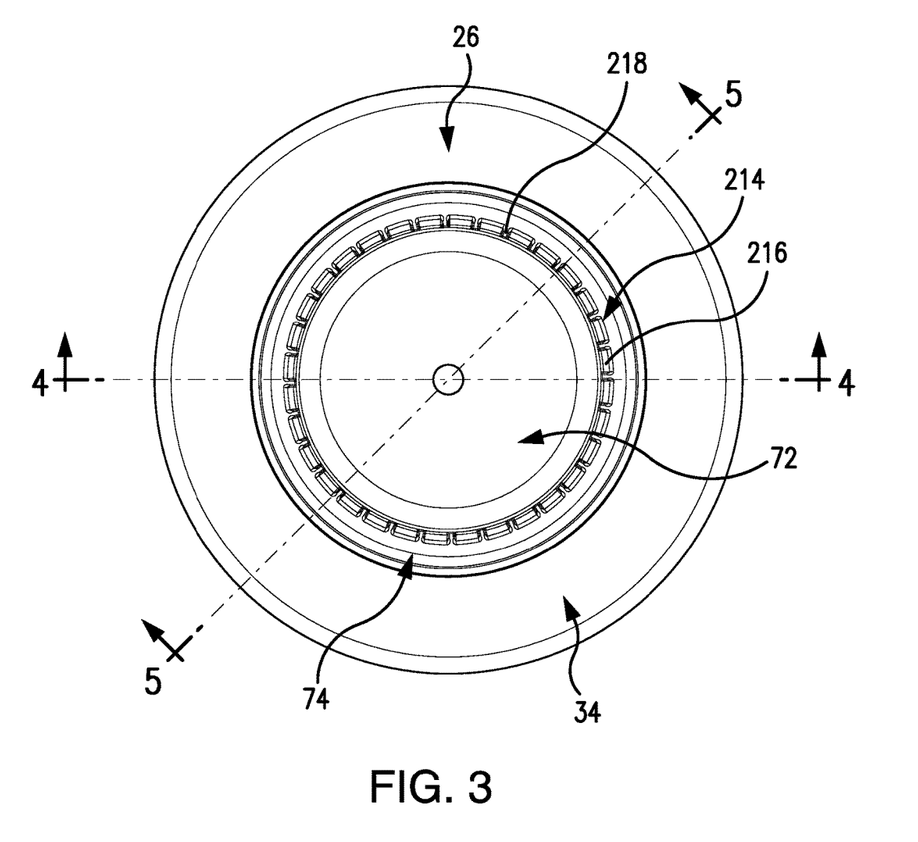
FIG. 3 is a top view of the portion of FIG. 2.
Figure 5:
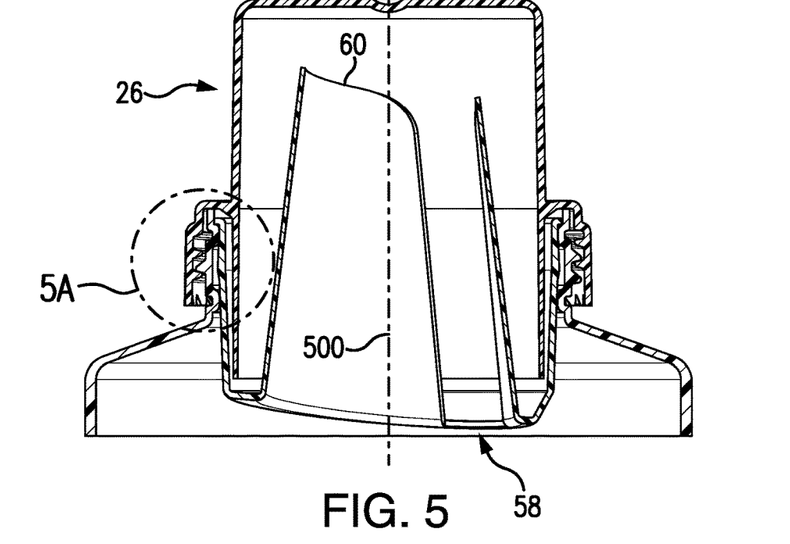
FIG. 5 is a central vertical sectional view of the portion of FIG. 3, taken along line 5-5.
Figure 5A:
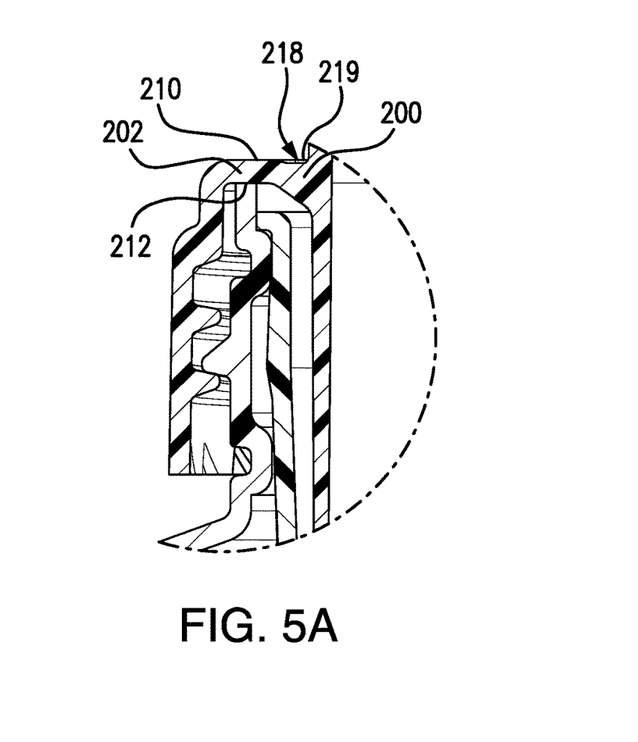
FIG. 5A is an enlarged view of a portion of a rim area.

FIG. 4A further shows the flange 74 having an inboard portion 200 and an outboard portion 202. The exemplary outboard portion 202 is essentially radial along a flange upper surface 210 (FIG. 5A) and lower surface or underside 212. The underside 212, along the exemplary inboard portion 200, tapers upwardly and radially outwardly. FIGS. 2 and 3 show the upper surface 210 as having a segmented annular recess 214 along the inboard portion 200. The recess is made of a circumferential array of recess segments 216 separated by walls or ribs 218. An exemplary segment (or rib) count is 20 to 50, more particularly, 25 to 40. The ribs have a pair of lateral surfaces forming circumferential ends of the adjacent two recess segments and an upper rim surface 219. The upper rim surface may be slightly recessed or slightly proud or coplanar with the adjacent upper surface depending upon implementation. For example, it may be slightly subflush to a portion of the upper surface 210 radially outboard thereof. Exemplary recess depths are 0.017 inch to 0.055 inch (0.4 mm to 1.4 mm) or about 1.0 mm or 0.7 mm to 1.2 mm. Exemplary thickness of the walls/ribs are substantially less than the corresponding recess segment dimension. Exemplary thickness of the walls/ribs are slightly less than the corresponding wall thickness of the flange aside the recess. This helps prevent sink during mold release. Exemplary flange wall thickness is 0.040 inch (1.0 mm), more broadly 0.8 mm to 1.4 mm vs. rib thickness of 0.025 inch (0.64 mm), more broadly 0.4 mm to 0.9 mm. Thus, exemplary rib thickness is between 30% and 100% of exemplary flange wall thickness or between 40% and 80% or between 50% and 80%.

As is discussed further below, the underside 212 along the outboard portion 202 is what comes into sealing engagement with the bottle body rim 38 when the cap is tightened down. The angling of the flange underside along the inboard portion 200 (e.g., 20°-50° or 30°-40° off-horizontal/radial) creates an effect different from that of the aforementioned Ser. No. 14/790,435 application. Whereas the flange underside in the aforementioned application tends to only drive the bottle neck rim radially outward, the exemplary configuration may help radially capture the rim both radially inward and outward. Accordingly, the exemplary rim need not be correspondingly rounded to provide a camming interaction and may be essentially radial/flat.

As in the Ser. No. 14/790,435 application, the flange geometry helps reduce plastic deformation of the flange during mold ejection (when a withdrawing core tends to pull down on the dosing tube) in addition to reducing elastic deformation in use. In the exemplary case, the ribs provide reinforcement. Relative to merely having a thickening without the recess segments 216, cooling is improved. Thus, a more massive unrecessed portion 200 might deform (post-molding warp) more due to less efficient cooling.

Exemplary radial span of the portion 202 is selected to be sufficient to engage the rim 38 allowing for eccentricity and subsequent deformation (e.g., 30-60%, more particularly 35-55% of the span of the flange underside with the surface portion of 200 being 23-60% or 35-55% and transitions accounting for any remainder).

In an exemplary method of manufacture and assembly, the cap and spout are separately molded (e.g., injection molded). The body is initially molded (e.g., blow molded or roto molded). This body molding leaves a precise exterior surface where the plastic engages the mold and leaves a less precise interior surface. The body molding also leaves a region of excess material of the neck protruding beyond where the ultimate mouth/rim will fall. For example, this may be excess material from the original parison used in a blow molding process.

After ejection from the mold, the neck is engaged by a clamp (e.g., a segmented annular clamp protruding into a channel or groove on the neck exterior surface associated with the protrusion). The excess material (or at least a portion thereof) may then be removed such as via cutting. Exemplary cutting is a guillotine-like cleaving along a cut line which leaves a precursor of the body rim.

Several factors may cause ultimate unevenness of the bottle rim. First, the clamping action may introduce a slight deformation to the neck. Upon release of the clamping, the rim may take a slight wave shape. Also, there may be asymmetries from thermal contraction. Normally, such a wave will create sealing difficulties with a cap. The high spots would resist further tightening of the cap, leaving potential gaps adjacent the low spots permitting leakage.

For example, assume the rim has two diametrically opposite high spots and two diametrically opposite low spots offset from the high spots by 90°. If the mouth initially has perfect circularity, the flange engagement will cause vertical compression at the high spots (e.g., at the corresponding channel in the neck OD surface directly below the high spots) to flatten the wave in the rim.

Relative to the Ser. No. 14/790,435 application, the flange geometry helps in certain cases of extremely eccentric bottle mouths or extreme installation misalignments. In the Ser. No. 14/790,435 application, if a portion of the bottle rim is so abnormally radially inwardly shifted, the corrective camming interaction may be lost. The Ser. No. 14/790,435 application's inward/upward taper of the flange underside inboard portion could drive that rim portion radially inward and prevent sealing. The opposite taper of FIG. 4A would drive the rim outward to ensure sealing.

To provide for such engagement, the bottle and cap threads may be provided with unusually high thread depths $D_{TE}$ and $D_{TT}$. The threads may also have a relatively large (large in proportion to overall neck diameter when compared with state-of-the-art) radial overlap depth Do thus providing increased thread strength to allow the threads to bear the load of deforming the bottle neck to seal against the cap. However, a relaxed gap between the tips of each thread and the receiving trough of the mating member may also be greater than in a baseline thread. The gap can also accommodate greater variations in as-molded bottle neck size or eccentricity. Exemplary thread depths are 0.055 inch (1.40 mm) contrasted with slightly smaller 0.047 inch (1.19 mm) threads used on baseline bottles of similar neck size. Exemplary overlap is 0.020 inch (0.51 mm), leaving gaps of 0.035 inch (0.90 mm).

An exemplary assembly involves assembling the spouts to the bottles with the spouts cold (e.g., at room temperature) and the bottle bodies at elevated temperature (e.g., in excess of 100° F. (38° C.) or in excess of 120° F. (49° C.) immediately after the molding/cutting/reaming process). This means the bottle neck is relatively thermally expanded and relatively soft so that it can easily receive the spout and then continue to contract and conform to/interlock with the spout.

Various implementations may have one or more of various advantages. One group of advantages relate to eliminating the cost of a gasket/liner between the cap and the bottle rim. It may also avoid the need for more complicated spout fitment arrangements to provide good sealing (and thereby resulting in labor and/or material cost savings).

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments of the present invention have been described. Nevertheless, it will be understood that various modifications may be made without departing from the spirit and scope of the invention. For example, when implemented in the reengineering of an existing container configuration, details of the existing configuration may influence or dictate details of any particular implementation. Accordingly, other embodiments are within the scope of the following claims.

What is claimed is:

1. A container comprising:
    a body having a neck extending to a mouth defining a body opening;
    a spout fitment having:
        a spout within the body opening; and
        an outer wall within the neck; and
    a cap having:
        an upper sidewall;
        a flange protruding radially from the sidewall, an underside of the flange contacting the mouth; and
        an outer sidewall depending from the flange, an internal thread of the cap outer sidewall engaged to an external thread of the neck wall,
    wherein:
    the flange has an upper surface having an interrupted annular recess.

2. The container of claim 1 wherein:
    the interrupted annular recess comprises 20-50 segments separated by walls.

3. The container of claim 2 wherein:
    the walls are less than half the angular extent of the recess segments.

4. The container of claim 2 wherein:
    the walls are less than one-third the angular extent of the recess segments.

5. The container of claim 2 wherein:
    the walls have upper surfaces dropping subflush to a portion of the upper surface radially outward of the recess.

6. The container of claim 1 wherein:
    the flange underside has an outwardly upwardly tapering surface below the recess.

7. The container of claim 1 wherein:
    the interrupted annular recess has a depth of 0.017 inch to 0.055 inch (0.4 mm to 1.4 mm).

8. The container of claim 1 wherein:
    the spout fitment is subflush in the neck.

9. The container of claim 1 wherein:
    the fitment comprises a trough between the outer wall and spout with at least one drain aperture.

10. The container of claim 1 wherein:
    the body consists essentially of HDPE;
    the spout fitment consists essentially of low density polypropylene; and
    the cap consists essentially of copolymer polypropylene.

11. The container of claim 1 wherein:
    the body has an integrally molded handle; and
    an interior compartment of the body extends through the handle.

12. The container of claim 1 wherein:
    the fitment is neither adhered nor welded to the body.

13. The container of claim 1 wherein:
    the fitment is not threadingly engaged to the body.

14. The container of claim 1 further comprising:
    1.0-6.0 liters of a liquid within the body.

15. The container of claim 1 further comprising:
    at least 1.0 liter of liquid detergent or fabric softener within the body.

16. The container of claim 1 wherein:
    the body is a blow molded body.

17. A method for manufacturing the container of claim 1 comprising:
    molding the body;
    machining the molded body to form a surface portion of the neck; and
    threading the cap onto the body to a threaded condition where the surface portion extends to a contact location with the underside.

18. The method of claim 17 further comprising:
    prior to the threading, inserting the spout fitment into the body.

19. The method of claim 18 wherein:
    the inserting comprises inserting subflush to a rim.

* * * * *